US012756186B2

(12) United States Patent
Kokot et al.

(10) Patent No.: US 12,756,186 B2
(45) Date of Patent: Oct. 6, 2026

(54) JUMP STARTER

(71) Applicant: Vanair Manufacturing, Inc., Michigan City, IN (US)

(72) Inventors: Ralph Kokot, Crown Point, IN (US); Kai Justice, Wheatfield, IN (US); Timothy R. Strong, Farmington, MN (US); Todd A. Zeigner, Rolling Prairie, IN (US)

(73) Assignee: VANAIR MANUFACTURING, INC., Michigan City, IN (US)

( * ) Notice: Subject to any disclaimer, the term of this patent is extended or adjusted under 35 U.S.C. 154(b) by 795 days.

(21) Appl. No.: 18/178,586

(22) Filed: Mar. 6, 2023

(65) Prior Publication Data

US 2024/0305094 A1 Sep. 12, 2024

(51) Int. Cl.

| | |
|---|---|
| ***H02J 1/10*** | (2026.01) |
| ***F02N 19/00*** | (2010.01) |
| ***H02J 7/34*** | (2006.01) |
| ***H02J 7/80*** | (2026.01) |

(52) U.S. Cl.

CPC .............. *H02J 1/122* (2020.01); *F02N 19/00* (2013.01); *H02J 7/345* (2013.01); *H02J 7/80* (2026.01); *H02J 2207/20* (2020.01)

(58) Field of Classification Search

CPC .......... H02J 1/122; H02J 7/0047; H02J 7/345; H02J 2207/20; H02J 2310/46; H02J 7/342; F02N 19/00; F02N 2011/0888; F02N 11/14

See application file for complete search history.

(56) References Cited

U.S. PATENT DOCUMENTS

| | | | | |
|---|---|---|---|---|
| 6,263,192 | B1 * | 7/2001 | Alderton | H04B 1/1607 455/574 |
| 9,819,204 | B2 * | 11/2017 | Miller | G06F 1/263 |
| 9,912,183 | B2 | 3/2018 | Kokot, Jr. et al. | |
| 10,819,132 | B2 * | 10/2020 | Gordon | H02J 7/345 |
| 11,394,232 | B2 * | 7/2022 | Nook | H02J 7/0042 |
| 11,811,252 | B2 * | 11/2023 | Nook | H01M 50/20 |
| 2015/0102781 | A1 * | 4/2015 | Inskeep | H02J 7/342 320/166 |
| 2016/0329731 | A1 * | 11/2016 | Kokot, Jr. | B60L 53/16 |
| 2017/0310153 | A1 * | 10/2017 | Inskeep | B60L 53/14 |
| 2018/0083469 | A1 * | 3/2018 | Bauer | F02N 19/001 |
| 2020/0052517 | A1 * | 2/2020 | Rosso | H02J 7/345 |
| 2020/0124014 | A1 * | 4/2020 | Wang | H02J 7/35 |
| 2021/0061119 | A1 * | 3/2021 | Akaishi | H02J 1/10 |
| 2022/0158462 | A1 * | 5/2022 | Lei | H02J 7/0045 |

(Continued)

*Primary Examiner* — Nha T Nguyen

(74) *Attorney, Agent, or Firm* — Brad C. Spencer

(57) ABSTRACT

A jump starter unit for starting vehicles and other equipment. The jump starter includes DC-to-DC converter and one or more large capacitors (500 Farad or more). The DC-to-DC converter maintains the capacitor's charge when a jump charge is not needed. The DC-to-DC converter and capacitor(s) are integrated into an electrical system that includes an electronic control and a plurality of relays that provide the various charging and jump functions of the unit. The jump starter unit may take the form of a portable or mobile self-contained apparatus having its own lithium battery to provide power to the DC-to-DC converter. The jump starter unit may be integrated into a device with another DC power source to provide power to the jump starter.

18 Claims, 1 Drawing Sheet

(56) References Cited

U.S. PATENT DOCUMENTS

| | | | | |
|---|---|---|---|---|
| 2022/0412054 | A1* | 12/2022 | Takeo | E02F 9/261 |
| 2024/0008194 | A1* | 1/2024 | Kim | H05K 7/14329 |
| 2024/0324153 | A1* | 9/2024 | Kim | H02M 3/003 |

* cited by examiner

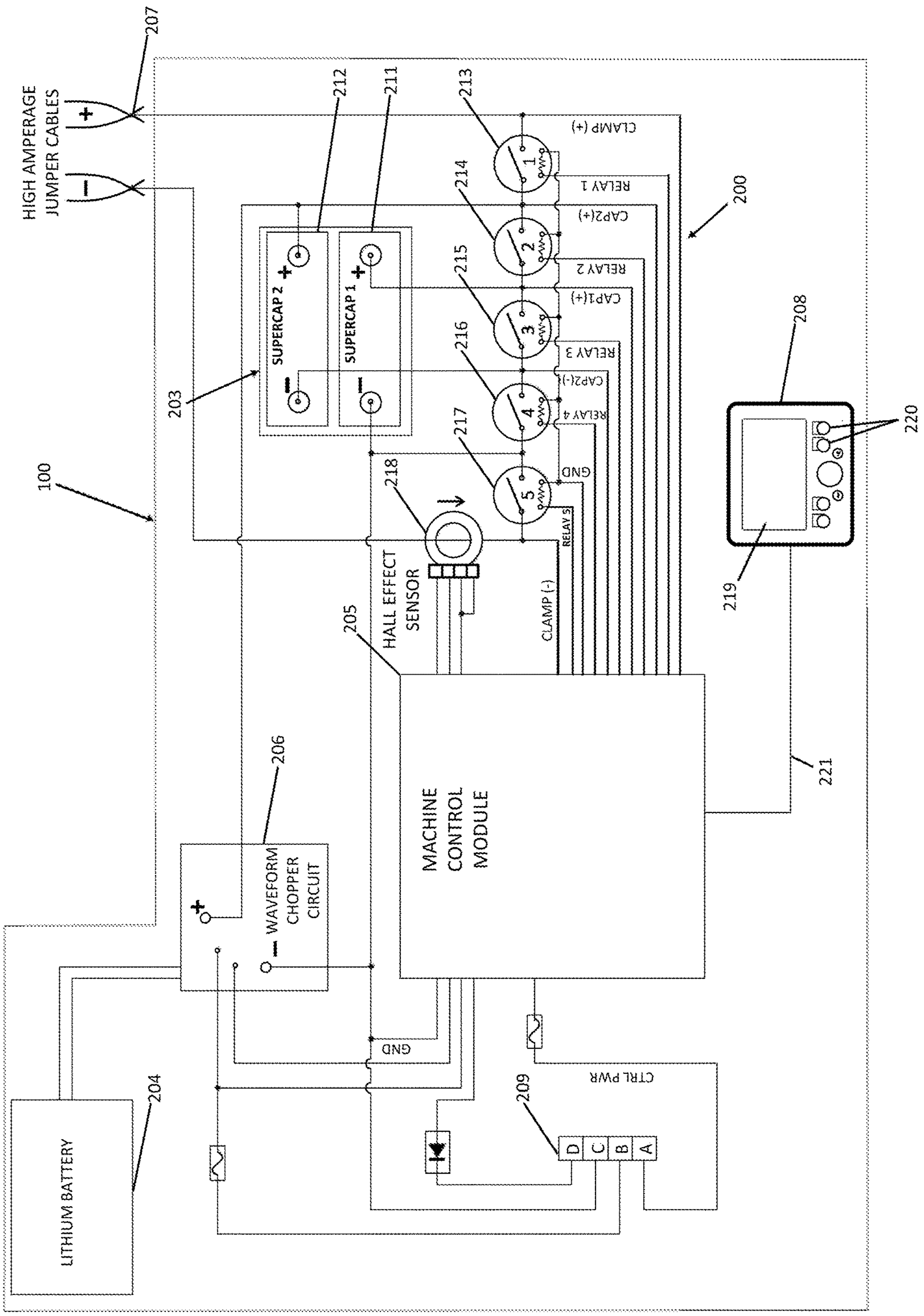
HIGH AMPERAGE JUMPER CABLES
207
+
−
212
211
213
214
215
216
217
200
203
100
SUPERCAP 2
SUPERCAP 1
CLAMP (+)
RELAY 1
CAP2(+)
RELAY 2
CAP1(+)
RELAY 3
CAP2(-)
RELAY 4
GND
RELAY 5
1
2
3
4
5
218
HALL EFFECT SENSOR
CLAMP (-)
205
MACHINE CONTROL MODULE
208
220
219
221
206
WAVEFORM CHOPPER CIRCUIT
GND
CTRL PWR
209
D
C
B
A
204
LITHIUM BATTERY

JUMP STARTER

BACKGROUND OF THE INVENTION

The invention generally relates to jump starters used to start internal combustion engines of vehicles and other equipment.

Battery chargers and jump starters are commonly used to "jump start" or "boost start" internal combustion engines of vehicles and other equipment. Chargers and jump starters are connected to the vehicle's battery by electrical cables that provide a jump of electrical power to start the vehicle. Chargers and jump starters are often powered by alternating current (AC) line power or direct current (DC) generators.

Battery chargers are designed to recharge drained batteries, but many chargers have a "jump" or "engine start" assist feature, which provides some additional electrical power to assist in starting a vehicle. Despite being able to assist in starting a vehicle, these types of battery chargers perform their task over a longer period of time, rather than an instantaneous jump. Using their "jump" mode, an AC battery charger may take five to twenty minutes to "jump" a dead battery depending on the depth-of-discharge (DOD), health of the vehicle battery, and type of engine (engine displacement).

Jump starters are devices specifically designed to jump start a vehicle in which the battery voltage is below the required starting voltage often referred to as a dead vehicle, using jumper cables in the place of an additional running vehicle. Jump starters are often standard equipment for tow trucks and roadside assistance vehicles. Jump starters may take the form of a portable unit or be integrated into the vehicle's equipment and electrical package. Jump starters are typically portable devices that are battery or AC powered. Often jump starters use large 200 plus amp capacitors to provide the surge or "jump" of electrical power needed to start the vehicle. Capacitor jumped jump starters are often used to start vehicles with internal combustion engines that have high inertial starting loads. While providing the additional starting "jump" of electrical power, capacitors must be recharged after every start attempt. Typically, the capacitors of jump starters are charged and recharged using AC line power or the DC power system of a host or other vehicle.

In addition, both battery chargers and jump starters are limited, heretofore by the length of the jumper cables. Even with large capacitors (200 plus amp), conventional jump starters have been ineffective at starting large engine vehicles with jumper cables longer than nine to ten feet. The resistance in the jumper cable at lengths greater than nine feet (9') is too much for the jump starter's capacitors to overcome. Although the capacitors have a great amount of stored electrical energy, they have a relatively low amount of available electrical power. The electrical power from the jump starter is quickly dissipated through the resistance of the jumper cables' wire. Wire rated at 0.053 ohms/1000 ft, such as standard 3/0 electric power cables, is unable to carry the power discharged by the capacitor and deliver it in a usable state at a length over nine to ten feet. This short cable length is a significant disadvantage for applications, such as roadside assistance. Even with portable jump starters, the location or position of the vehicle to be started requires a length of jumper cables that robs needed cranking power from the jump starter.

Therefore, it would be desirable to have a jump starter that can provide sufficient electrical power to jump start a large engine at a longer distance away and that does not have to be coupled to an AC power source or to the DC power system of a host vehicle.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, equipment and methods capable of jump starting internal combustion engines of vehicles and other equipment.

According to a nonlimiting aspect, a jump starter for providing an electrical current to a battery of an engine to charge the battery and/or jump start the engine is provided. The jump starter may include jumper cables adapted to connect to a battery of a vehicle, a DC-to-DC converter having an output amperage above 200 amps for outputting an electrical current to the jumper cables, a battery connected to the DC-to-DC converter. a capacitor array having a capacitance greater than 1000 farads and 130 kilojoules at 12 volts or 250 Farads and 130 kilojoules at 24 volts for outputting additional electrical current through the jumper cables, control circuitry operatively connected to the DC-to-DC converter and the capacitor array, wherein the control circuitry is adapted to connect to the jumper cables for controlling the electrical current from the DC-to-DC converter and the capacitor array through the jumper cables, and wherein the control circuitry includes circuit elements operatively connected to the DC-to-DC converter and the capacitor array for charging and recharging the capacitor array from the DC-to-DC converter, and a human-machine interface (HMI) operatively connected to the control circuitry and configured for switching between a jump start mode and a charge mode. In the jump start mode, the control circuitry may provide electrical current from the DC-to-DC converter and the capacitor array through the jumper cables. In the charge mode, the control circuitry may deliver electrical current from the DC-to-DC converter through the jumper cables to jump start the vehicle engine without providing electrical current from the capacitor array through the jumper cables.

Technical aspects of jump starters as described above preferably include the capability of providing a convenient, portable, user-friendly apparatus for starting vehicles without local access to AC power, and/or providing a more convenient alternative to DC generator devices.

These and other aspects, arrangements, features, and/or technical effects will become apparent upon detailed inspection of the figures and the following description.

BRIEF DESCRIPTION OF THE DRAWINGS

FIG. 1 is a schematic illustration of a dual 12V/24V DC electrical control circuit of a jump starter according to certain nonlimiting aspects of the invention.

DETAILED DESCRIPTION OF THE INVENTION

The intended purpose of the following detailed description of the invention and the phraseology and terminology employed therein is to describe what is shown in the drawing, which relates to a nonlimiting embodiment of the invention, and to describe certain but not all aspects of the embodiment(s) depicted in the drawings and/or to which the drawings relate. The following detailed description also identifies certain but not all alternatives of the embodiment(s) depicted in the drawing. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

A jump starter according to aspects of the present invention may be used to start the internal combustion engines of vehicles and other equipment. Preferably, the jump starter is a mobile jump starter adapted to use long jumper cables for starting large vehicle engines with high inertial loads, such as very large internal combustion engines, including but not limited to gasoline, diesel, hydrogen, propane, and compressed natural gas engines.

In some arrangements, the jump starter is configured for starting large vehicles, such as trucks and other large equipment, using jumper cable at lengths up to fifty (50) feet or more. The jump starter may include a lithium or other type of battery, high output DC-to-DC converter, and one or more super capacitors (e.g., a capacitor having capacitance of at least 500 farads and 65 kilojoules each, totaling at 1000 Farads and 130 kilojoules at 12 volts or 250 Farads and 130 kilo-joules at 24 volts). The DC-to-DC converter maintains the capacitor's charge when the jump charge is not needed. The DC-to-DC converter and capacitor(s) are integrated into electrical control circuitry that includes an electronic control module and a plurality of relays that provide the various charging and jump functions of the starter unit. In certain embodiments, the jump starter may take the form of a portable and/or mobile self-contained unit having its own lithium battery to provide power to the DC-to-DC converter. In other embodiments, the jump starter may be integrated into a device with another DC power source to provide power to the jump starter, such as a service vehicle.

The DC-to-DC converter in conjunction with one or more large capacitors allows the jump starter to use longer jumper cables. When the capacitor(s) are used in conjunction with a lithium battery and a DC-to-DC converter, the resistance in the jumper cables at lengths up to fifty (50) feet can be overcome and provide enough cranking power, roughly 800 amps at 14 volts for 3-5 seconds for a 12-volt system, or an equivalent 24-volt requirement, to start large vehicle engines. Longer jumper cables mean greater reach and convenience. The DC-to-DC converter is preferably a high-output circuit that allows the capacitor(s) to be quickly recharged between multiple starting attempts from power supplied by the battery 204. Consequently, a jump starter incorporating principles of this invention may in some configurations provide a convenient, portable, user-friendly apparatus for starting vehicles without local access to AC power and a superior alternative to DC generator devices. Such a jump starter may be well suited for use in fleet applications and for starting vehicles and equipment with large, hard-cranking, internal engines, such as large trucks, tractors, boats, large stationary power plants, and other equipment having large internal combustion engines.

The above-described features and advantages, as well as others, will become more readily apparent to those of ordinary skill in the art by reference to the following detailed description and accompanying drawings.

Turning now to the example configuration shown in FIG. 1, a jump starter 100 is configured to function as both a battery charger and jumper (jump starter) for an engine. As used herein, the terms jump, jumper, jump start booster, and typical variations thereof are used to refer generally to the action of providing enough supplemental electrical power to a dead or low charge battery (that is, a battery that has lost charge such that it cannot provide sufficient electrical power to start the engine) on an engine to allow the engine to start, whereas the term battery charger refers to a device that provides electrical power to recharge the dead or low-charge battery, but may not be enough to jump start the engine. The jump starter 100 is preferably a multi-voltage system configured to function at different voltage requirements to be able to jump start vehicles having different electrical systems, such as a dual voltage system configured to jump start vehicles having either a 12-volt electrical system or a 24-volt electrical system, though this could be any combination of required voltages for a given application, including but not limited to 36V, 48V, etc. The jump starter 100 preferably is configured as a portable self-contained multi-purpose machine for large vehicle recovery applications. However, in other arrangement, the jump starter 100 may be in a fixed or stationary configuration and/or may only be configured for use with one voltage level system or with more than two different voltage level systems.

The jump starter 100 includes a battery 204, a DC-to-DC converter 206, a capacitor array 203, a control module 205, and a human-machine interface (HMI) 208. The DC-to-DC converter 206 provides a high output electrical device that is used to convert the voltage from the lithium battery 204 into a voltage suitable to charge and recharge the capacitors 211 and 212. The HMI 208 includes a control panel through which a user can input control commands for the controlling the various operations of the jump starter 100, for example with a display screen 219 and various input devices, such as switches, knobs, and/or buttons 220. The HMI 208 is connected to the control module 205 via an electrical umbilical cord 221 so that the control panel may be remotely located from the support frame for operator convenience. Alternatively, the control panel can be mounted to the support frame or integrated into a host vehicle. The battery 204 is preferably a rechargeable battery. In one example, the battery 204 is a lithium battery; however, other types of batteries could be used. The capacitor array 203 is formed of two separate 500 farad (65 kilo-joule) "super" capacitors 211 and 212 configured to work together to provide a voltage across the jumper cables 207. For example, the capacitors 211 and 212 may have a combined capacitance greater than 1000 farads and 130 kilojoules at 12 volts or 250 Farads and 130 kilojoules at 24 volts for providing a single large electrical power surge through the jumper cables 207. However, in other arrangements the capacitor array 203 may be formed of a single capacitor or more than two capacitors configured to work together to provide a desired electrical output to the jumper cables 207. The DC-to-DC converter 206, control module 205, relays 213-217, and super capacitor(s) 211 and 212 may be enclosed in a separate component housing. Jumper cables 207 are attached to a connector. Jumper cables may be conventional 3/0 jumper cables well known in the arts or other types of jumper cables suitable for jump starting an engine or recharging a battery.

This arrangement of components does not preclude using other technologies and/or arrangements to accomplish the similar functions. For example, the battery 204 can be substituted with or supplemented with a DC power source, including but not limited to a DC generator, a DC alternator, or batteries using other chemistry. The DC-to-DC converter 206 preferably transforms the DC power from the battery 204 for use suitable for jump starting an engine and/or charging the capacitor array as described variously herein. For example, the DC-to-DC converter 206 may be a wave-form chopper circuit. The DC-to-DC converter 206 can include or be substituted with or include other forms of power manipulation circuitry, including but not limited to a step up converter, step down converter, inverter, rectification circuitry, buck converter, boost converter, and/or an AC/DC transformer. The 500 farad (65 kilo-joule) super capacitors 211 and 212 can be substituted and/or supplemented with capacitors of other ratings sufficient to store and deliver the power as needed. Such high energy super capacitors are specialty components available from vendors, such as LS Mtron in Anyang, Gyeonggi-do, China.

FIG. 1 schematically illustrates the electronic control circuitry 200 of the jump starter 100. The electronic control circuitry 200 controls the operations and functionality of the jump starter 100. Due to the high electrical currents needed to charge and jump start large disabled vehicles and equipment, the control circuitry 200 includes a number of low amperage control relays and high amperage relays to electrically isolate and protect control logic components and circuitry from the high current outputs of the DC-to-DC converter 206 and super capacitor(s) 211 and 212 within the same electrical system. The battery 204 provides the separate, self-contained power source for the jump starter 100 and is used to drive the DC-to-DC converter 206. The capacitors 211 and 212 have a pair of contact terminals. Electrical wires affixed to the contact terminals of the capacitors 211 and 212 connect the capacitors array 203 to voltage switching circuitry, including the electrical relays 213, 214, 215, 216, and 217, and to other control circuitry of the jump starter 100. A control module 205 provides microprocessor-controlled logic and function for the jump starter 100.

The HMI 208 has a display screen 219 that displays visual displays representing various operation modes and system statuses to a user. The HMI 208 may also have pushbuttons 220 that allow the user to select the different functions. Other types of HMI arrangements may be used, such as touch screens, toggle switches, voice activated functionality, etc. The HMI 208 is configured to allow a user to manually switch the jump starter 100 between two different operational modes, a "battery charge" mode in which the jump starter 100 is configured to recharge a battery but not necessarily jump start an engine, and an "engine start" mode in which the jump starter 100 is configured to jump start an engine. For each operational mode, the HMI 208 is configured to allow a user to manually switch between multiple voltage modes, such as but not limited to a "12V" mode configured for charging a 12V electrical system and a 24V mode configured for charging a 24V electrical system. The HMI 208 is configured to display disabled vehicle connection faults indicators as well as other faults detected in the jump starter 100.

The programmable electronic control module 205 stores the control logic and function programming for the jump starter 100. The control module 205 is a conventional programmable multi-pin I/O microprocessor, although other types of control modules may be used. Such programmable microprocessors are commonly used in control circuitry and are well known in the art. Control module 205 is a part of control circuitry 200 that governs the operation of jump starter 100, receiving input signals from the user and from voltage and current sensors, and coordinating control signals in response thereto. The control logic and programming stored within the control module 205 uses the input signals to control the function and safe operation of the jump starter 100. The control module 205 controls the function of jump starter 100 by activating various high amperage relays, such as relay switches 213-217. The control module 205 is also wired to the HMI 208 (user interface), which displays various graphic and/or text displays on the to the display screen 219 in the event of a various particular operational conditions based on the control logic and programming.

The control module 205 is electrically wired to the five relays 213-217, which actuate to provide the charging and jump starting functions of the jump starter 100. The "Capacitor charge" relays 214 and 216 connect to the DC-to-DC converter 206 and to the capacitors 211 and 212 for charging the capacitor array 203. The relays 213 and 217 connect the DC-to-DC converter 206 to the jumper cables 207 for charging a disabled vehicle. The relays 213-217 are connected to the DC-to-DC converter 206 and the capacitors 211 and 212 and are configured to deliver starting current through jumper cables 207 to the disable vehicle.

The control circuitry 200 is configured as a dual voltage system, which allows users to manually switch between two different voltage settings, such as a 12-volt mode and 24-volt mode to accommodate jumping and/or charging disabled vehicles having either 12-volt or 24-volt electrical systems. The dual voltage function is provided by selecting 12V or 24V charge or start modes on the HMI 208, the control module 205, three "voltage switching" high amperage relays 214, 215, and 216, and two high relays 213 and 217 to connect the output cables 207 and the DC-to-DC converter 206. The control module 205 is electrically connected to the DC-to-DC converter 206, which regulates the power charging the capacitors 211 and 212 to approximately 16 volts. When in charge mode, the DC-to-DC converter 206 regulates the voltage output to approximately 14.2 volts in the 12V charge mode or 28.4 volts in the 24V charge mode. The voltage output from the DC-to-DC converter 206 is set at the time the user/operator selects the function to be performed. The control module 205 in some arrangements initiates relays activating safety contactors/relays to switch between a 12-volt mode and a 24-volt mode. The 12-volt mode is implemented activating relays 214 and 216. The 24-volt mode is implemented by activating relay 215. The control circuitry 200 also includes various other electronic components, such as resistors, diodes, and fuses, which are not particularly relevant to the design, function, or operation of this invention. Such electrical components and their general use in the control circuitry 200 are readily known and understood in the industry.

The jump starter 100 has two user selected operational modes: a "Charge" mode and a "Engine Start" mode. In addition, the jump starter 100, as a dual voltage system, has two different voltage modes ("12-Volt" mode and "24-Volt" mode) for each operational mode. The jump starter 100 functions similarly in both operational modes for either voltage mode. A user sets the desired operational mode and voltage mode for the jump starter 100 for the particular application by pressing a specified pushbutton 220 on the HMI 208. In the "Engine Start" mode, the jump starter 100 is used to start a disabled vehicle with a dead battery. In the "battery charge" mode, the jump starter 100 is used to charge or recharge a dead battery.

In use in either operational mode, the jump starter 100 is first started by supplying power to a connector 209, which powers up the control circuitry 200 with all various relays and components with most relay circuits initially open. Once the jumper cables 207 are physically connected between the jump starter 100 and the battery of a disabled vehicle or equipment, the control module 205, through its control logic and programming, automatically checks the jumper cables 207 for positive output voltage from the battery of the disabled vehicle. If negative or zero voltage is detected, the control module 205 activates and displays a "Reverse Polarity Fault" screen on the HMI 208 and prevents all relays from being energized. The control module 205 also checks the resistance between the plus and minus jumper connections. If a short circuit is detected, the control module 205 activates and displays a "Short Circuit Fault" screen on the HMI 208 and prevents all relays from being energized. If an open circuit is detected, the control module 205 activates and displays a "Connection Fault" screen on the HMI 208 and prevents all relays from being energized. If any of the above faults are detected, the fault must be fixed before the jump starter 100 can be used for either charging or jumping. If no faults are detected, but a zero voltage is still sensed, a user may activate a manual activation function by pressing and holding the charge or start buttons on the HMI 208, which allows the process to proceed in the selected mode.

Once started, the control module 205 continuously monitors the voltage of the capacitors 211 and 212. If the capacitors 211 and 212 have a voltage less than a certain minimum threshold voltage, such as 13.5 volts in 12-volt mode or 27 volts in 24-volt mode, the control module 205 activates safety relays 214 and 216 to charge the capacitors 211 and 212. The control module 205 deactivates the relays 214 and 216 periodically, such as every thirty seconds, to check the charge of the capacitors 211 and 212. During this process of charging the capacitors 211 and 212, the control module 205 activates and displays a "Capacitor Charging" screen on the HMI 208. When the voltage has reached the predefined threshold voltage, the control module 205 deactivates the relays 214 and 216 and activates and displays a "Ready" screen on the HMI 208.

In the "Engine Start" mode, the following operational steps are initiated by the control module 205 through its control logic and programming to enable and perform the "jump" process for starting a disabled vehicle. First, the control module 205 activates the "Cap Charge" relays 214 and 216 to begin charging the super capacitors 211 and 212 of the capacitor array 203 (Step 1). Next, the control module 205 continues to charge the super capacitors 211 and 212 for approximately fifteen seconds or until the capacitors are fully charged, whichever occurs first. During this capacitor charging operation, the other safety relays remain open or not activated.

The control module 205 monitors the various voltage levels within the control circuitry 200. If any minimum voltage requirements are not met, the control module 205 activates and displays a "Voltage Fault" screen on the display screen 219 of the HMI 208 and disables the charging operation of the jump starter 100. However, if all voltage requirements are met, the control module 205 activates the relays 213 and 217 to check for proper jumper cable connection (Step 2). The control module 205 deactivates the relays, terminating the process, and activates and displays a "Connection Fault" screen on the display screen 219 of the HMI 208, if one or both cables are disconnected or if the polarity is reversed.

Once the voltage of the capacitor array 203 is within the minimum and maximum thresholds, and the jumper cables 207 are properly connected with continuity and open circuit errors, the control module 205 activates the relays 213 and 217, which begins the jump process providing voltage from the DC-to-DC converter 206 and the capacitors 211 and 212 of the capacitor array 203 through the jumper cables 207 to the vehicle or equipment being started (Step 3). The control module 205 simultaneously reads the amperage from the various current sensors. If current flow through the jumper cables 207 is detected, the control module 205 activates and displays a "Charge/Start Enabled" screen and shows the voltage and amperage on HMI 208. If no current to the jumper cables 207 is detected, the control module 205 opens all the safety relays, thereby terminating the jump process, and activates and displays a "Voltage Fault" screen on the display screen 219 of the HMI 208.

At this point, if the jump process has been terminated, a user may still manually override the control module 205 with a "Manual Activation" function by pressing and holding the mode button on the HMI 208. The "Manual Activation" function causes the control module 205 to close the relays 213 and 217 and allow electrical current to flow through the jumper cables 207 to the vehicle battery for the duration of the selected mode. While the "Manual Activation" function is active, the control module 205 activates and displays a "Manual Activation" screen on HMI 208.

While an engine is being jump started by the jump starter 100, a user turns the key to start the disabled vehicle being jumped (Step 4). It may take several tries to start the vehicle, and during this process the DC-to-DC converter 206 and the super capacitors 211 and 212 of the capacitor array 203 provide electrical current sufficient to start the engine. Once the vehicle starts (or if it does not due to other issues), the operator terminates the jump process by pressing the "Stop" button or the mode select button on the HMI 208.

In the "Charge" mode, the jump starter 100 may be used to charge a dead battery of disabled vehicles. The operation of the jump starter 100 in the "Charge" mode differs from the "Start" mode only in that the control module 205 does not pull current from the super capacitors 211 and 212, but rather, electrical power is provided only from the battery 204. In the "Charge" mode, the control module 205 activates and displays a "Charge" screen showing voltage and amperage readings on the display screen 219 of the HMI 208.

In the "Charge" mode, the following operational steps are initiated by the control module 205 through its control logic and programming to enable and perform the "charge" process for charging a vehicle battery. First, in the "Charge" mode, the control module 205 monitors the various voltage levels within the control circuitry 200. If any minimum voltage requirements are not met, the control module 205 activates and displays a "Voltage Fault" screen on the display screen 219 of the HMI 208 and disables the charging operation of jump starter 100. However, if all voltage requirements are met, the control module 205 activates the relays 213 and 217 to check for connection of the jumper cables 207 with the battery being charged, such as a vehicle battery (Step 1). If one or both jumper cables 207 are disconnected, or if the polarity is reversed, the control module 205 deactivates the relays, thereby terminating the charging process, and activates and displays a "Connection Fault" screen on the display screen 219 of the HMI 208.

Next, the control module 205 activates the DC-to-DC converter 206, thereby beginning the charge process and providing voltage from the DC-to-DC converter 206 through the jumper cables 207 to the vehicle or equipment being started (Step 2). The control module 205 simultaneously reads the amperage from the current sensor 218, which in this example is a Hall effect sensor. If current flow is detected by the current sensor 218, the jump starter 100 will continue to charge the dead battery. The control module 205 may be configured to automatically terminate the charging process after a pre-defined period, such as forty-five (45) minutes. If no current flow through current sensor 218 is detected, the control module 205 opens the relays 213 and 217, thereby terminating the charge process, and activates and displays a "Voltage Fault" screen on the display screen 219 of the HMI 208. At this point, if the charge process has been terminated, a "Manual Activation" function may be activated by the user to close the relays 213 and 217 and restart the charging process. As in "Start" mode, the "Manual Activation" function is used in the "Charge" mode to allow current to flow through the jumper cables 207 to the vehicle battery for the duration of the mode selected. Again, control module 205 activates and displays the "Manual Activation" screen on the display screen 219 of the HMI 208.

While charging a battery in the charge mode, the jump starter 100 provides current through the jumper cables 207 from the battery 206 (or other DC voltage source) through DC-to-DC converter 206 to the vehicle battery. Once the vehicle battery is fully charged, the charge process can be terminated by pressing the "Stop" button or the mode select button on the HMI 208.

The jump starter 100 employs several operational and safety features during the jump and charge processes. For example, the control module 205 through its control logic and programming provides several safety checks to ensure safe and proper connection to the vehicle battery prior to allowing current to flow through the jumper cables 207 to the vehicle battery. Various operational conditions are preferably indicated by activation of various fault alerts on the HMI 208, such as with the various screens displayed on the display screen 219. The control module 205 checks for proper jumper cable connection to the vehicle battery and provides protection against open jumper cables connections, jumper cables being reversed (polarity), and short circuits. The control circuitry 200 also detects if the vehicle battery can take a charge.

At any time during the charge process or the jump process, if the connection of the jumper cables 207 and the vehicle battery is compromised, for example, a cable comes off the battery terminal, the control module 205 initiates a "Connection Fault" condition, which deactivates the relays 213-217 and deactivates the DC-to-DC converter 206. This prevents current from flowing through the jumper cables 207 and activates and displays a "Connection Fault" screen on the display screen 219 of the HMI 208. If the jumper cables 207 are shorted together, and a pre-defined threshold level of current is sensed (e.g., more than 1100 amps for the 12-volt mode, or 550 amps for the 24-volt mode), the control module 205 automatically deactivates the relays 213-217 and deactivates the DC-to-DC converter 206. This stops the current flowing through jumper cables 207. The control module 205 will automatically terminate ("time out") the jump process after a pre-defined period, such as fifteen minutes. If no usage is detected by the current sensor 218 or there is not a momentary voltage drop in excess of three volts during the 15 minute period, for example if no starting load has been placed on the system, the jump starter 100 acts as a battery charger. In this circumstance, the HMI 208 shows a "Time Out" fault alert, for example, on the display screen 219. If the operator then wants to initiate a jump process after this time, the fault has to be cleared and then the Start-Mode hs to be re-selected. At any time during use, a "Stop" or "esc" buttons can be pressed, for example one of the buttons 220 and/or a virtual button on the display screen 219, to halt either the charge process or the start processes.

A jump starter in accordance with the principles described herein may deliver a high amperage current flow for starting large vehicles and heavy equipment. Such jump starters may also be used on smaller vehicles such as passenger cars. The jump starters may be configured for use with standard 3/0 jumper cables of lengths up to at least fifty feet. The jump starter preferably includes its own high output power manipulation circuitry, a high-output capacitor array, for example having one or more super capacitors (a capacitor having capacitance of at least 500 farads and 65 kilojoules each, totaling at 1000 Farads and 130 kilo-joules at 12 volts or 250 Farads and 130 kilo-joules at 24 volts), and micro-processor-controlled, relay-activated, high amperage relays. When the high-output capacitor array is used in conjunction with high output DC-to-DC converter and a lithium battery, the resistance in the jumper cables at lengths up to fifty feet (and potentially longer) can be overcome and provide enough cranking power, roughly 800 amps at 14 volts for 3-5 seconds, to start large vehicle engines. The DC-to-DC converter is also used to maintain the capacitor's charge when the jump charge is not needed and to quickly recharge the capacitor(s) in preparation for repeated start attempts.

In some embodiments, the jump starter may be configured as a purpose-dedicated (or "stand alone") machine that is used to charge and jump start disabled vehicles and/or other large internal combustion engines. In other embodiments, the jump starter may be incorporated as part of a multi-purpose machine, which may include other field recovery components and equipment, such as an air compressor, generator, welder, and the like. The jump starter may also be integrated directly into a host vehicle, such as a utility vehicle, where the jump starter uses and shares certain electrical system functions with the host vehicle. When integrated into a utility vehicle, optionally the vehicle's DC power output can be used to charge and recharge the capacitor(s) in place of and/or in conjunction with the battery of a portable unit.

The jump starter may be adapted to accommodate different electrical systems of different disabled vehicles. In certain embodiments, the jump starter may be specifically designed for use as a dedicated starter for vehicles and equipment having various electrical systems, including but not limited to 12V, 24V, 36V, 48V, etc., as may be appropriate for a given application. In the exemplary embodiment illustrated and described herein, the jump starter employs voltage switching circuitry to be able to be used with vehicles and equipment having either a 12-volt electrical system or a 24-volt electrical system.

In some embodiments, the operator need only make the proper connections with the jumper cables to the dead battery for the engine and select the proper function, and the charging process and jump process are performed automatically through the microprocessor control module, the control relays, and the safety relays. Thus, it is believed that the jump starters disclosed herein provide an easy to use and convenient system for starting vehicles and equipment with large hard cranking engines.

As previously noted above, though the foregoing detailed description describes certain aspects of one or more particular embodiments of the invention, alternatives could be adopted by one skilled in the art. For example, the jump starter and its components could differ in appearance and construction from the embodiments described herein and shown in the drawings, functions of certain components of the jump starter could be performed by components of different construction but capable of a similar (though not necessarily equivalent) function, and various materials could be used in the fabrication of the jump starter and its components. As such, and again as was previously noted, it should be understood that the invention is not necessarily limited to any particular embodiment described herein or illustrated in the drawings.

The invention claimed is:

1. A jump starter for providing an electrical current to an engine battery to charge the engine battery and/or jump start the engine, the jump starter comprising:

jumper cables adapted to connect to a battery of a vehicle;

a DC-to-DC converter having an output amperage above 200 amps for outputting an electrical current to the jumper cables and providing at least a dual voltage function;

a battery connected to the DC-to-DC converter;

a capacitor array having a capacitance greater than 1000 farads and 130 kilojoules at 12 volts or 250 Farads and 130 kilojoules at 24 volts for outputting additional electrical current through the jumper cables;

control circuitry operatively connected to the DC-to-DC converter and the capacitor array, wherein the control circuitry is adapted to connect to the jumper cables for controlling the electrical current from the DC-to-DC converter and the capacitor array through the jumper cables, and wherein the control circuitry includes circuit elements operatively connected to the DC-to-DC converter and the capacitor array for charging and recharging the capacitor array from the DC-to-DC converter; and a human-machine interface (HMI) operatively connected to the control circuitry and configured for switching between a jump start mode and a charge mode;

wherein in the jump start mode the control circuitry provides electrical current from the DC-to-DC converter and the capacitor array through the jumper cables, and in the charge mode the control circuitry delivers electrical current from the DC-to-DC converter through the jumper cables to charge the engine battery and without providing electrical current from the capacitor array through the jumper cables, wherein the control circuitry includes a control module operatively connected to the DC-to-DC converter and the capacitor array, and wherein the control module comprises a microprocessor having control logic and programming for monitoring and controlling the electrical current outputted from the DC-to-DC converter and the capacitor array through the jumper cables;

wherein the control circuitry comprises voltage switching circuitry configured for selectively delivering electrical current from the DC-to-DC converter and the capacitor array through the jumper cables at a first voltage level and a second voltage level, and wherein the HMI is operatively connected to the control module and configured for switching between a first voltage mode and a second voltage mode, wherein in the first voltage mode the voltage switching circuitry is configured to deliver the electrical current from the DC-to-DC converter and the capacitor array through the jumper cables at the first voltage level, and wherein in the second voltage mode the voltage switching circuitry is configured to deliver the electrical current from the DC-to-DC converter and the capacitor array through the jumper cables at the second voltage level.

2. The jump starter of claim 1, wherein the battery is a rechargeable battery.

3. The jump starter of claim 2, wherein the battery is a lithium battery.

4. The jump starter of claim 1, wherein the capacitor array has only one capacitor.

5. The jump starter of claim 1, wherein the capacitor array comprises a plurality of capacitors.

6. The jump starter of claim 1, wherein the voltage switching circuitry includes one or more relays each operatively connected to the control module, the DC-to-DC converter and the capacitor array.

7. The jump starter of claim 1, wherein the control circuitry includes circuitry elements operatively connected to the jumper cables to detect connection faults with the jumper cables and to terminate the electrical current from the DC-to-DC converter and the capacitor array through the jumper cables when a connection fault is detected.

8. The jump starter of claim 7, wherein the circuitry elements include fault alerts on the HMI that are shown when a connection fault is detected.

9. The jump starter of claim 1, wherein the control circuitry includes circuitry elements operatively connected to the jumper cables, the control module, the DC-to-DC converter, and the capacitor array to detect voltage levels within the control circuitry and to terminate the electrical current from the DC-to-DC converter and capacitor array through the jumper cables when the detected voltage levels are outside predetermined levels.

10. The jump starter of claim 9, wherein the circuitry elements are configured to generate a display on a display screen of the HMI that is shown when the detected voltage levels are outside the predetermined levels.

11. The jump starter of claim 1, wherein the control circuitry includes circuitry elements operatively connected to the capacitor array to detect the voltage level of the capacitor array.

12. The jump starter of claim 11, wherein the circuitry elements are configured to generate a display on a display screen of the HMI that is shown when the detected voltage level is above a predetermine voltage level.

13. The jump starter of claim 1, wherein the control circuitry is configured to generate a display on a display screen of the HMI for detecting the voltage level of the engine battery and to generate a display for visually indicating the detected voltage level of the engine battery.

14. The jump starter of claim 1, further comprising an enclosure for the HMI and the control circuitry, wherein the HMI comprises an interface and a display screen to show operational conditions.

15. The jump starter of claim 14, wherein the HMI comprises pushbuttons.

16. The jump starter of claim 1, further comprising:

a portable frame supporting; and a housing mounted to the frame, wherein the housing encloses the DC-to-DC converter, the capacitor array, and the control circuitry.

17. The jump starter of claim 1, wherein the DC-to-DC converter comprises a waveform chopper circuit.

18. A jump starter for providing an electrical current to an engine battery to charge the engine battery and/or jump start the engine, the jump starter comprising:

jumper cables adapted to connect to a battery of a vehicle;

a DC-to-DC converter having an output amperage above 200 amps for outputting an electrical current to the jumper cables and providing at least a dual voltage function;

a battery connected to the DC-to-DC converter;

a capacitor array for outputting additional electrical current through the jumper cables;

control circuitry operatively connected to the DC-to-DC converter and the capacitor array, wherein the control circuitry is adapted to connect to the jumper cables for controlling the electrical current from the DC-to-DC converter and the capacitor array through the jumper cables, and wherein the control circuitry includes circuit elements operatively connected to the DC-to-DC converter and the capacitor array for charging and recharging the capacitor array from the DC-to-DC converter; and a human-machine interface (HMI) operatively connected to the control circuitry and configured for switching between a jump start mode and a charge mode;

wherein in the jump start mode the control circuitry provides electrical current from the DC-to-DC converter and the capacitor array through the jumper cables, and in the charge mode the control circuitry delivers electrical current from the DC-to-DC converter through the jumper cables to charge the engine battery and without providing electrical current from the capacitor array through the jumper cables, wherein the control circuitry includes a control module operatively connected to the DC-to-DC converter and the capacitor array, and wherein the control module comprises a microprocessor having control logic and programming for monitoring and controlling the electrical current outputted from the DC-to-DC converter and the capacitor array through the jumper cables, wherein the control circuitry comprises voltage switching circuitry configured for selectively delivering electrical current from the DC-to-DC converter and the capacitor array through the jumper cables at a first voltage level and a second voltage level, and wherein the HMI is operatively connected to the control module and configured for switching between a first voltage mode and a second voltage mode, wherein in the first voltage mode the voltage switching circuitry is configured to deliver the electrical current from the DC-to-DC converter and the capacitor array through the jumper cables at the first voltage level, and wherein in the second voltage mode the voltage switching circuitry is configured to deliver the electrical current from the DC-to-DC converter and the capacitor array through the jumper cables at the second voltage level.

* * * * *